US011123692B2

(12) United States Patent
Lang et al.

(10) Patent No.: US 11,123,692 B2
(45) Date of Patent: Sep. 21, 2021

(54) HOLLOW FIBRE MEMBRANE HAVING THREE DIMENSIONAL TEXTURING

(71) Applicant: FRESENIUS MEDICAL CARE DEUTSCHLAND GMBH, Bad Homburg (DE)

(72) Inventors: Armin Lang, Tholey (DE); Dieter Bechtel, Neunkirchen (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 116 days.

(21) Appl. No.: 16/076,702

(22) PCT Filed: Mar. 1, 2017

(86) PCT No.: PCT/EP2017/054768
§ 371 (c)(1),
(2) Date: Aug. 9, 2018

(87) PCT Pub. No.: WO2017/149011
PCT Pub. Date: Sep. 8, 2017

(65) Prior Publication Data
US 2019/0046932 A1    Feb. 14, 2019

(30) Foreign Application Priority Data
Mar. 1, 2016   (DE) ............... 10 2016 002 440.2

(51) Int. Cl.
*B01D 69/08*    (2006.01)
*B01D 67/00*    (2006.01)
(Continued)

(52) U.S. Cl.
CPC ......... *B01D 69/084* (2013.01); *B01D 61/243* (2013.01); *B01D 63/02* (2013.01);
(Continued)

(58) Field of Classification Search
USPC ..... 210/85, 96.2, 117, 252, 253, 257.2, 232, 210/321.6, 321.72, 321.8, 321.87, 321.88,
(Continued)

(56) References Cited

U.S. PATENT DOCUMENTS 3,616,928 A * 11/1971 Rosenblatt ........... B01D 69/084
 210/321.8
4,681,720 A 7/1987 Baumgart et al.
(Continued)

FOREIGN PATENT DOCUMENTS

CH    537874 A    7/1973
CN    1400920 A   3/2003
(Continued)

OTHER PUBLICATIONS

International Search Report issued in corresponding International Patent Application No. PCT/EP2017/054768 (with English translation) dated May 12, 2017 (7 pages).
(Continued)

*Primary Examiner* — Hayden Brewster
(74) *Attorney, Agent, or Firm* — Kilyk & Bowersox, P.L.L.C.

(57) ABSTRACT

Hollow-fibre membrane having at least one first curl in the form of a first wave which is characterized by a first oscillation plane and a first wavelength and at least one second curl in the form of a second wave which is characterized by a second oscillation plane and a second wavelength, characterized in that the first oscillation plane and the second oscillation plane confine an angle with one another which is different from zero.

18 Claims, 1 Drawing Sheet

Figure 1:
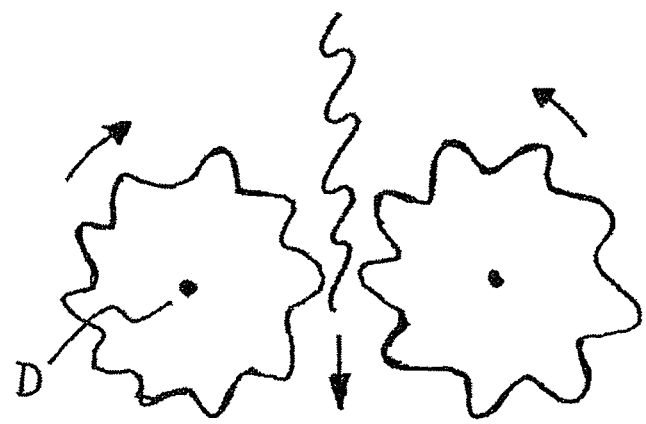

(51) Int. Cl.
    *B01D 63/02*     (2006.01)
    *B01D 61/24*     (2006.01)
    *D02G 1/14*     (2006.01)
    *B01D 71/68*     (2006.01)

(52) U.S. Cl.
    CPC ....... *B01D 63/021* (2013.01); *B01D 67/0009* (2013.01); *B01D 67/0086* (2013.01); *B01D 71/68* (2013.01); *D02G 1/14* (2013.01); *B01D 2323/42* (2013.01); *B01D 2325/24* (2013.01)

(58) Field of Classification Search
    USPC ... 210/21.89, 321.9, 323.1, 323.2, 340, 454, 210/497.01, 500.23, 645, 650, 653, 806
    See application file for complete search history.

(56) References Cited

U.S. PATENT DOCUMENTS

| | | |
|---|---|---|
| 2006/0243653 A1 | 11/2006 | Heinrich et al. |
| 2009/0238967 A1 | 9/2009 | Helff et al. |
| 2010/0000936 A1 | 1/2010 | Osabe et al. |
| 2010/0170850 A1* | 7/2010 | Heilmann ............. B01D 69/08 210/646 |

FOREIGN PATENT DOCUMENTS

| | | |
|---|---|---|
| GB | 2009034 A | 6/1979 |
| JP | H11247041 A | 9/1999 |
| JP | 2005246192 A | 9/2005 |
| JP | 2008155009 A | 7/2008 |
| JP | 2008190081 A | 8/2008 |
| KR | 20020094675 A | 12/2002 |

OTHER PUBLICATIONS

Office Action issued in corresponding Chinese Patent Application No. 201780014567.6 (English translation) dated Dec. 28, 2020 (10 pages).

Office Action issued in corresponding Japanese Patent Application No. 2018-545815 (English translation) dated Mar. 4, 2021 (5 pages).

* cited by examiner

HOLLOW FIBRE MEMBRANE HAVING THREE DIMENSIONAL TEXTURING

This application is a National Stage Application of PCT/EP2017/054768, filed Mar. 1, 2017, which claims priority to German Patent Application No. 10 2016 002 440.2, filed Mar. 1, 2016.

The present invention relates to a hollow-fibre membrane with three-dimensional curl, to a process for producing the fibres, to a bundle comprising the fibres and to a filter device comprising the bundle. The filter device is preferably a hollow-fibre dialyser for haemodialysis.

Hollow-fibre dialysers typically comprise a hollow-fibre bundle arranged in a cylindrical filter housing. During dialysis, blood flows through the interior of the fibres and the dialysate flows in countercurrent to the blood in the space between fibres and filter housing. The purpose of a dialyser is to bring about the exchange of substances through the wall of the hollow fibres.

To increase the efficiency of substance exchange in hollow fibres used for haemodialysis, it is known to provide the hollow fibres in the form of curled hollow fibres.

WO 01/60477 relates to a filter device, preferably for haemodialysis, which consists of a cylindrical filter housing and a bundle of curled (crimped) hollow fibres.

EP 2 119 494 relates to hollow-fibre membranes and to a module containing the hollow fibres. The hollow fibres have a curl, where the curl wavelength is from 15 to 25 mm.

EP 1 714 692 relates to a dialysis filter comprising wavy hollow fibres.

DE 28 51 687 relates to hollow, semi-permeable fibres for use in fluid separations, the fibres comprising a multiplicity of waves. Since, in the therein-described production, the forces exerted on the hollow fibres vary with the depth of the hollow fibre within the bundle, irregular waves are formed on the hollow fibres, with the outer portions of the bundle having a lower, more spacious crimp than the hollow fibres arranged in the inner centre of the bundle.

EP 0 116 155 relates to a process and a device for producing filament bundles, wherein the filaments have a curl (wave). Here, the hollow fibres are guided in a zigzag shape around round rods which are arranged in two planes and spaced apart and which are guided at the same speed as the hollow fibres in a continuous manner through a fixing zone. The filament bundles can be used for mass transfer and heat transfer, for example for blood dialysis. This document also discloses that a process which provides for the passing of a hollow filament through two intermeshing, but non-contacting, cog wheels may be technically disadvantageous for producing curled hollow fibres.

In view of the ongoing demand for new hollow-fibre membranes suitable for haemodialysis, it is an object of the present invention to provide a hollow-fibre membrane having improved properties.

This object is achieved with a hollow-fibre membrane as defined in any of Claims 1, 11 and 13. Preferred embodiments are defined in the claims dependent thereon. The co-independent claims define further aspects of the invention using the hollow fibre.

The terms in quotation marks that are used hereinafter are defined in the context of the invention.

In a first aspect, the invention provides a hollow-fibre membrane having at least one first curl in the form of a first wave which is characterized by a first oscillation plane and a first wavelength and at least one second curl in the form of a second wave which is characterized by a second oscillation plane and a second wavelength, characterized in that the first oscillation plane and the second oscillation plane confine an angle which is different from zero.

The term "hollow-fibre membrane" refers to a hollow fibre having membrane-type walls composed of an organic material. Such hollow-fibre membranes are known from the prior art and can be produced according to known processes, for example by spinning processes.

An exemplary embodiment of a suitable hollow-fibre membrane consists of from 90 to 99 percent by weight of a hydrophobic first polymer and from 10 to 1 percent by weight of a hydrophilic second polymer. In this connection, the hydrophobic first polymers are, for example, selected from the following group: polyarylsulphones, polycarbonates, polyamides, polyvinyl chloride, modified acrylic acid, polyethers, polyurethanes or the copolymers thereof. The hydrophilic second polymers are, for example, selected from the following group: polyvinylpyrrolidone, polyethylene glycol, polyglycol monoesters, copolymers of polyethylene glycol with polypropylene glycol, water-soluble derivatives of cellulose or polysorbates. In a preferred embodiment, the fibre comprises the materials polysulphone and polyvinylpyrrolidone.

The term "curl" means that the fibre is not completely straight along its length, but has instead deviations from the straight line. The term "curl" is an umbrella term for terms such as "undulation", "crimp", "corrugation", "wave" or "texture", which are used in the prior art.

Hereinafter, the term "curl" is defined on the basis of the term "wave". Therefore, the term "curl" encompasses a wave or a periodic wave or can be equated with a wave or a periodic wave, i.e. the curl is present in the form of a wave.

In the physical sense, a periodic wave is a spatially propagating oscillation of a location-dependent and time-dependent physical variable which is characterized at least by an oscillation plane and a wavelength.

According to the invention, the hollow-fibre membrane has at least two different curls, and each of the curls—since they comprise waves or consist of waves—can be described by an oscillation plane and a wavelength in each case.

Therefore, the first curl in the form of a first wave is characterized by a first oscillation plane and a first wavelength, and the second curl in the form of a second wave is characterized by a second oscillation plane and a second wavelength.

According to the invention, the first oscillation plane and the second oscillation plane confine an angle with one another which is different from zero.

The term "the first oscillation plane and the second oscillation plane confine an angle with one another which is different from zero" therefore also means that the first and the second oscillation planes cannot lie in parallel to one another or in one plane.

In one embodiment, the angle is from 70° to 110°.

In a further embodiment, the angle is from 85° to 95°.

In a further embodiment, the angle is 90°, i.e. the oscillation planes are perpendicular to one another. Said embodiment is preferred, since such an arrangement can exhibit a particularly good mechanical stability.

In a further embodiment, a hollow-fibre membrane according to the invention can also have various angles between the at least two oscillation planes.

According to the invention, the wavelengths of the first wave and of the second wave are identical or different from one another.

Preferably, the wavelength of the first wave is from 3 to 15 mm in one embodiment. In a further embodiment, the wavelength of the first wave is from 4 to 10 mm. In a further embodiment, the wavelength of the first wave is from 6 to 8 mm.

Preferably, the wavelength of the second wave is from 20 to 50 mm. In a further embodiment, the wavelength of the second wave is from 25 to 40 mm. In a further embodiment, the wavelength of the second wave is from 25 to 35 mm.

In one embodiment, the wavelength of the first wave is from 3 to 15 mm and the wavelength of the second wave is from 20 to 50 mm.

In a further embodiment, the wavelength of the first wave is from 4 to 10 mm and the wavelength of the second wave is from 25 to 40 mm.

In a further embodiment, the wavelength of the first wave is from 6 to 8 mm and the wavelength of the second wave is from 25 to 35 mm.

Apart from oscillation plane and wavelength, a wave can also be characterized by an amplitude.

In one embodiment, the first amplitude has a value of from 0.2 to 0.6 mm. In a further embodiment, the first amplitude is from 0.3 to 0.5 mm.

In one embodiment, the second amplitude has a value of from 2.0 to 6.0 mm. In a further embodiment, the second amplitude is from 2.5 to 4.5 mm.

In one embodiment, the first amplitude is from 0.2 to 0.6 mm and the second amplitude is from 2.0 to 6 mm.

In a further embodiment, the first amplitude is from 0.3 to 0.5 mm and the second amplitude is from 2.5 to 4.5 mm.

In certain embodiments, the hollow-fibre membrane is characterized by a combination of first wavelength and the amplitude thereof, second wavelength and the amplitude thereof, and the angle of the oscillation planes of first and second wave in relation to one another.

In one embodiment, the wavelength of the first hollow-fibre membrane is from 3 to 15 mm, and the amplitude thereof is from 0.2 to 0.6 mm, the wavelength of the second wave is from 20 to 50 mm, the amplitude thereof is from 2 to 6 mm, and the angle confined by the oscillation planes of the waves is from 70° to 110°.

In another embodiment, the wavelength of the first wave of the hollow-fibre membrane is from 6 to 8 mm, the amplitude thereof is from 0.2 to 0.6 mm, the wavelength of the second wave is 25-35 mm and the amplitude thereof is from 2 to 6 mm, and the angle confined by the oscillation planes of the waves is from 80° to 100°.

In a further embodiment, the first wavelength of the fibre is 7 mm and the amplitude thereof is 0.4 mm. The second wavelength is 30 mm and the amplitude thereof is 3.5 mm. The oscillation planes of the first wave and of the second wave occupy an angle of 90°.

In one embodiment, the first curl and the second curl comprise periodic waveforms or consist of periodic waveforms.

Typical periodic waveforms are a triangle oscillation, a sawtooth oscillation, a rectangle oscillation or a sine oscillation (sinusoidal oscillation) or overlaps of two or more of said oscillations.

In one embodiment, both the first wave and the second wave are sine-shaped (sinusoidal).

In comparison with hollow fibres having merely a single curl, the hollow fibres of the present invention exhibit an improved mechanical strength, for example against twisting. This means that they can be processed more easily. For example, they provide cleaner cut edges upon cutting, and this leads to a lower level of rejects.

In a second aspect of the invention, a hollow-fibre membrane is provided which is designed such that a hollow-fibre membrane bundle produced therefrom has a highest possible demoulding force of from 3.4 to 10 N when the bundle is moulded into the cylindrical housing of a hollow-fibre membrane filter for dialysis. Such hollow-fibre membranes are the subject matter of Claims 11 to 14. More particularly, a curled hollow-fibre membrane is concerned here, as is likewise subject matter of the present invention.

The resulting hollow-fibre bundle has a demoulding force of from 3.4 to 10 N on a hollow-fibre membrane bundle produced therefrom having 16896 fibres, when the hollow-fibre membrane bundle is demoulded from a cylindrical shell having a diameter of 41.4 mm. Preference is given in the second aspect of the invention to hollow-fibre membranes which effect a demoulding force of from 3.4 to 7 N; further preference is given to those hollow-fibre membranes which effect a demoulding force of from 3.6 to 5 N. In one embodiment, the hollow-fibre membrane has a fibre diameter of from 170 to 210 µm.

Customarily, a hollow-fibre membrane bundle is compressible in the radial direction and is introduced into the cylindrical housing of the cylindrical filter housing with radial compression during the production of hollow-fibre membrane filters. In this connection, the restoring force of a hollow-fibre membrane bundle represents the efforts by the bundle to pass into a relaxed form.

The stronger the restoring force of the hollow-fibre membrane bundle, the greater too the demoulding force required for pulling out the hollow-fibre membrane bundle from the cylinder.

Lastly, the restoring capacity of the hollow-fibre membrane bundle is adjustable via the curl of the fibres. Depending on the wavelength and amplitudes of the curls, it is possible to effect a more or less strong restoring force of the hollow-fibre membrane bundle, correlating with a more or less strong demoulding force.

In the second aspect of this invention, it was found that bundles, the demoulding force of which is elevated by the nature of the curl, are more easily manageable in the hollow-fibre membrane filter production process, since they exhibit a higher mechanical stability and lead to fewer rejects during production. The higher mechanical stability results from a stronger mutual support of the fibres in the hollow-fibre bundle. In the production process for hollow-fibre membrane filters, it was therefore observed that there are fewer fibre breakages.

In a third aspect, the invention provides a process for producing the hollow-fibre membrane according to the invention. The process comprises at least steps (a) and (b):

(a) providing a hollow-fibre membrane having a first curl in the form of a first wave which is characterized by a first oscillation plane and a first wavelength;

(b) applying a second curl to the hollow-fibre membrane provided in step (a), in the form of a second wave which is characterized by a second oscillation plane and a second wavelength;

the application in step (b) being effected such that, after application, the first oscillation plane and the second oscillation plane confine an angle which is different from zero.

In one embodiment, the wavelengths are selected such that the first wavelength is shorter than the second wavelength.

In step (a), a curled fibre as is known from the prior art can be provided. The curled fibre can also be produced according to processes known from the prior art.

In this connection, in one embodiment, the curl of the hollow-fibre membrane provided in step (a) is generated by a hollow-fibre membrane without curl being passed through at least two counter-rotating cog wheels. The shape of the cogs of the cog wheels, the distances of adjacent cogs from one another and also the height of the cogs are in this case selected such that the desired waveform of the first wave, the desired first wavelength and the desired first amplitude are set.

In step (b), a further curl is then applied to said curled fibre which was provided in step (a).

Preferably, in this connection, the hollow-fibre membrane of step (a) is guided through at least two counter-rotating cog wheels in step (b). In this case, the rotation axes of the cog wheels are aligned perpendicular to the first oscillation plane of the hollow-fibre membrane provided in step (a), i.e. the curler cog wheels are preferably arranged parallel to one another.

It was found that, surprisingly, in the case of parallel arrangement of the curler cog wheels of the first and second steps, the oscillation plane of a wave-stamped hollow-fibre membrane after a first step of wave-stamping executes one twist when it is pulled into the curler of the second step. In such an arrangement, the oscillation plane of the hollow-fibre membrane executes a 90° C. twist after the first step in order to be pulled into the second step. This effect is all the more pronounced the shorter the wavelength generated in the first step.

The shape of the cogs of the cog wheels, the distances of adjacent cogs and the height of the cogs are in this case selected such that the desired waveform of the second wave and also the desired second wavelength and the desired second amplitude are set.

It is self-evident that it is also possible to select a setting such that angles deviating from an angle of 0° are formed. An arrangement having an angle of 90° is possible too.

In further accordance with the invention, the wavelengths of the first wave and of the second wave are preferably selected such that the first wavelength is shorter than the second wavelength.

FIG. 1 shows schematically a process for producing the hollow fibres according to the invention. Here, a hollow fibre having a first curl in the form of a first wave characterized by a first oscillation plane and a first wavelength is guided through at least two counter-rotating cog wheels (in the arrow direction), the rotation axes D of the cog wheels not being aligned perpendicular to the first oscillation plane, but parallel instead. In the course of this, a second curl characterized by a second oscillation plane and a second wavelength is applied to the hollow-fibre membrane. In this connection, the application in step (b) is effected such that, after application, the first oscillation plane and the second oscillation plane confine an angle which is different from zero. In FIG. 1, the angle is to be approximately 90°. The wavelengths are selected such that the first wavelength is shorter than the second wavelength.

For the application of a curl, the hollow-fibre membrane can be provided in a form as has been described in the prior art, i.e. for example, plasticized by solvent. The waves can then be fixed by the solvent being evaporated.

On the other hand, it is also possible to heat the cog wheels used for applying the curl, and so the hollow-fibre membrane is thermally deformed.

Figure 2:
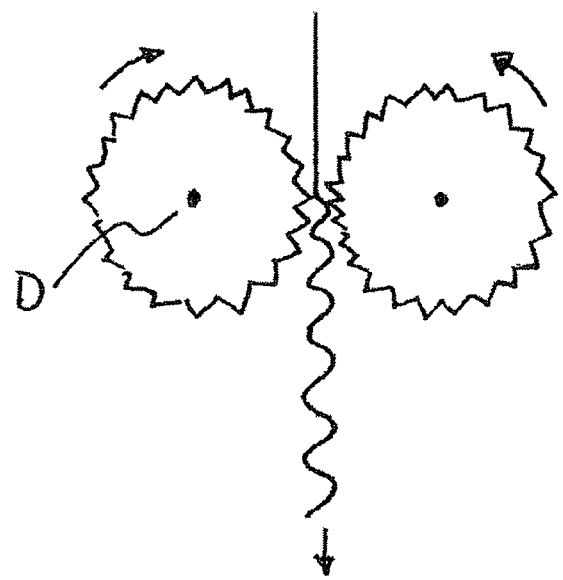

FIG. 2 shows schematically the production of a hollow fibre provided in step (a), wherein the curl of said fibre is produced by a substantially linear hollow-fibre membrane being passed through two counter-rotating cog wheels (in the arrow direction). Here, the rotation axes are perpendicular to the oscillation plane of the formed curled hollow fibre having the first curl in the form of a first wave characterized by a first oscillation plane and a first wavelength.

As depicted schematically in FIGS. 1 and 2, the wavelengths of the first curl and of the second curl, wherein that of the second curl must be greater than that of the first curl, can be set by the shape of the cogs of the cog wheels, the distance of adjacent cogs from one another and also the height of the cogs.

The hollow fibres of the present invention can be processed to form a bundle according to known processes. Said known processes envisage, for example, the trimming of the hollow fibres to a certain length. The hollow fibres can then be shaped to form a bundle, with the ends of the fibres being cast with appropriate resins such as polyurethanes for fixation.

The production of the hollow-fibre membrane filament per se can be carried out according to a known spinning process with phase inversion. Typical range parameters for a spinning process for a hollow-fibre membrane will be specified below. These conditions lead to the hollow-fibre membranes according to the present invention, but are not to be understood to be restrictive.

All of the following "%" data are percent by weight data.

For this purpose, a spinning dope consisting for example of from 16 to 18% polysulphone, from 3 to 6% polyvinylpyrrolidone and from 76 to 81% dimethylacetamide is prepared and the temperature is adjusted to from 30 to 60° C. The spinning dope is extruded through a corresponding annular die together with a precipitant consisting of 25-40% water and 60-75% dimethylacetamide. The spinning dope is in this case extruded through an annular gap together with the precipitant escaping through a central circular opening of the spinneret die. The annular gap can have a typical gap width of from 30 to 50 µm and an inner diameter of from 150 to 300 µm.

The thus obtained spun filament can be guided through an air gap having a relative humidity value of from 40 to 100%, preferably from 80 to 100%, and a length of from 100 to 800 mm, preferably from 200 to 600 mm. Thereafter, the spun filament is introduced into a water precipitation bath adjusted to a temperature of from 60 to 80° C. for example and coagulated. The thus obtained hollow-fibre membrane is rinsed with water at temperatures of from 60° C. to 90° C. Thereafter, the hollow-fibre membrane is dried at temperatures of from 100 to 150° C. for from 1 to 10 minutes.

The diameter of the thus obtained hollow-fibre membrane and the wall thickness of the membrane can be adjusted via the extrusion rate of the spinning dope and of the inner precipitant. Typical lumen widths of thus obtained hollow-fibre membranes are between 150 and 350 µm. Typical wall thicknesses of such hollow-fibre membranes can be from 30 to 50 µm.

Following the described spinning process, the first curl and the second curl are impressed onto the hollow-fibre membrane by the appropriate curlers.

Apparently, it is important that the first wave-stamping stiffens the wave-shaped hollow-fibre membrane in the oscillation plane of the wave to the extent that a turn-over of the wave-shaped hollow-fibre membrane takes place during the transition to the 2nd curler step.

It has become apparent that the orientation of the two oscillation planes can depend on the wavelengths of the first wave and of the second wave in relation to one another. Therefore, in certain embodiments, a twist of the oscillation plane is also found which can accept angle values of from 70° to 110°.

Therefore, in a fourth aspect, the invention provides a bundle comprising hollow fibres as defined in the first or second aspect or hollow fibres produced according to a process as defined in the third aspect.

The hollow fibres of the present invention can be used for filtration purposes. To this end, they are typically arranged in a housing, preferably in the form of a bundle.

More particularly, hollow-fibre bundles composed of fibres as defined in the first aspect exhibit a stronger pre-tension than conventional hollow-fibre membrane bundles consisting of straight or singly wave-stamped hollow fibres. The term "pre-tension" refers to a measure of a restoring force exhibited by a bundle when it is compressed. Fibres as defined in the first aspect strive to occupy a larger space in the hollow-fibre bundle than conventional straight or singly wavy fibres. With identical fibre number and identical housing dimensions, a higher force is therefore needed in order to demould the fibres in a cylindrical housing of a filter module than is the case with singly wave-stamped fibres. Here, demoulding is understood to mean the sliding out or pulling out of a hollow-fibre bundle from the cylindrical enclosure surrounding the hollow-fibre bundle, for example a dialyser housing or a cover film.

Hollow-fibre membrane bundles which have such increased pre-tension and which are cut into bundle segments according to the currently customary bundling processes exhibit the advantage of evenly-cut cut edges, unlike what is observed in the case of cut edges of singly wave-stamped hollow-fibre membrane bundles. This has an effect especially during the casting of the fibre ends with a casting compound. A typical process for casting the fibre ends of hollow-fibre bundles is, for example, described in DE 10 2006 021 066 A1. According thereto, a liquid polyurethane prepolymer is, for example, used in the casting of the fibre ends of a hollow-fibre membrane bundle. In such processes, the casting compound penetrates into the end region of the fibre bundle and, after curing of the prepolymer, fixes the fibre ends in their position. This leads to so-called "casting wedges". A disadvantage is that a portion of the fibres is shifted from their position. This can lead to unusable filter modules later on in production. It was observed that the formation of such casting wedges decreases when the cut edge of the hollow-fibre membrane bundle can be produced more evenly.

A further positive effect of the inventive double curl of the hollow-fibre membrane consists in a more even fibre distribution of the fibres within the fibre bundle. Owing to a more even spacing of the fibres, the fibres in the hollow-fibre bundle are less likely to merge to form so-called strands. In zones of said strands, individual fibres are not freely flushable under filtration conditions. Strand formation is then always associated with a reduction in the filtration efficiency of the filter module. In the present case, it was possible to achieve an improvement in filtration through the double curl according to the invention and through the more even fibre distribution associated therewith.

Therefore, in a fifth aspect, the invention provides a filter device comprising a housing and a bundle as defined in the fourth aspect and arranged in said housing.

Preferably, the filter device is a hollow-fibre dialyser for haemodialysis.

Very generally, it is, however, possible for the hollow-fibre membrane as defined in the first aspect or second aspect or the hollow-fibre membrane produced according to a method as defined in the third aspect or the bundle as defined in the fourth aspect or the filter device as defined in the fifth aspect not to be used for the dialysis of blood, but for any fluid separation.

Consequently, in a sixth aspect, the invention also provides for the use of a hollow-fibre membrane as defined in the first aspect or second aspect or produced as defined in the third aspect, or the use of a bundle as defined in the fourth aspect, or the use of a filter device as defined in the fifth aspect, for fluid separation.

EXAMPLES

The measure of the filtration efficiency of dialysers that was used was the so-called clearance value, which was determined as described below. Clearance values of hollow-fibre bundles according to the invention were measured according to the requirements of the DIN EN ISO 8637 standard. This involved measuring both the input concentration and the output concentration of a particular guide substance during a simulated dialysis on a dialyser constructed from hollow-fibre bundles and calculating the clearance according to the formula:

$$Cl = Q_B\left(1 - \frac{C_{B,out}}{C_{B,in}}\right) + \frac{C_{B,out}}{C_{B,in}}$$

| | | |
|---|---|---|
| Cl | Clearance | [ml/min] |
| $Q_B$ | Flow rate on blood side | [ml/min] |
| $Q_F$ | Filtrate flow | [ml/min] |
| $C_{B, in}$ | Input concentration, blood side | |
| $C_{B, out}$ | Output concentration, blood side | |

Altogether, the clearance values were determined on 10 filter modules and the values obtained were averaged.

The clearance measurement was carried out as follows: A dialyser was produced by moulding of the hollow-fibre bundle to be investigated, by end-side casting of the fibre ends in the housing of the dialyser. The end-side casting separated the dialyser into two flow spaces, a blood-side flow space, which comprises the cavities of the fibres, and a dialysate-side flow space, which comprises the space surrounding the fibres.

The dialyser had an inlet port and outlet port on the blood side in order to introduce liquid into the fibre interior and to remove it at the other end of the fibres. Furthermore, the dialyser had an inlet port and an outlet port on the dialysate side in order to allow liquid to flow along the fibres on the dialysate side.

To carry out the clearance measurement, the dialysate side was flushed with a 1% aqueous potassium chloride solution at 37° C. at a flow rate of 500 ml/min. The test liquid adjusted to a temperature of 37° C. flowed through the blood side at a flow rate of 300 ml/min.

For the measurement of sodium clearance, the test liquid used was a 154 mmol/l sodium chloride solution. For the measurement of vitamin B12 clearance, a 36.07 μmol/l test solution was used. After the respective liquids had flowed through both flow sides for 10 minutes, the concentration of the analyte at the output of the blood side and at the output of the dialysate side was determined.

For the measurement of demoulding force, a fibre bundle driven into an HDPE film is used as a test body. In this case, the hollow-fibre membrane bundle inserted into the film assumes a cylindrical shape.

The fibre bundle is then slid out of the film cover, such that the hollow-fibre bundle freely towers above the film cover by 2 cm. With the aid of an adhesive strip, the free bundle end is wrapped and fixed on a receiver unit of a tensile tester. The thus enclosed bundle end then has the same diameter as the bundle driven into the film. The fibre bundle prepared in this manner is positioned horizontally on a test bench. The film is fixed with appropriate holding devices.

With the aid of the tensile tester, the fibre bundle was pulled out of the film shell. The pulling speed was 1 cm/sec. After 50% of the length of the fibre bundle had been pulled out of the film shell, the force value of the demoulding process was recorded on the tensile tester. The thus measured force value indicated the demoulding force of the fibre bundle.

Example 1

A fibre bundle according to the invention with double curl was moulded into a commercially available F60S filter housing from Fresenius Medical Care. Specifications relating to fibre number, active membrane area, fibre diameter, wall thickness of the hollow-fibre membrane and length of the hollow-fibre membrane in the dialyser housing are shown in Table 1. The fibres of the hollow-fibre membrane bundle according to the invention had a first curl having a wavelength of 3 mm and a second curl having a wavelength of 30 mm. The oscillation planes of the two curls were in a 90° angle in relation to one another.

The clearance values for sodium and vitamin B12 were determined according to the method described above. The sodium clearance was 253 ml/min. The vitamin B12 clearance was 135 ml/min.

Comparative Example 1

Fibres of the comparative example were obtained according to the same spinning process as the fibres of the exemplary embodiment. Fibre dimensions and pore structure were therefore identical to those of the fibres of the exemplary embodiment. The fibres of the example were then provided with a single curl having a wavelength of 30 mm. The fibres were combined to form bundles and moulded and casted into a commercially available F60S filter housing from Fresenius Medical Care according to the same method as in example 1.

The clearance values for sodium and vitamin B12 were determined according to the method described above. The sodium clearance was 238 ml/min. The vitamin B12 clearance was 127 ml/min.

TABLE 1

| | Example 1 | Comparative example 1 |
| --- | --- | --- |
| Housing inner diameter | 39 mm | 39 mm |
| Number of fibres | 9216 | 9216 |
| Fibre inner diameter | 200 μm | 200 μm |
| Wall thickness | 40 μm | 40 μm |
| Fibre length in the filter module | 227 mm | 227 mm |
| Active membrane area | 1.31 m² | 1.31 m² |
| 1st curl wavelength | 7 mm | — |
| Amplitude of the 1st wavelength | 0.4 mm | — |
| 2nd curl wavelength | 30 mm | 30 mm |
| Amplitude of the 2nd wavelength | 3.5 mm | 3.5 mm |
| Sodium clearance | 253 ml/min | 238 ml/min |
| Vit. B12 clearance | 135 ml/min | 127 ml/min |

Example 2

For the measurement of demoulding force, fibre bundles consisting of 16896 fibres having a length of 280 mm were produced. The fibre inner diameter of the fibres was 183 μm and the wall thickness of the fibres was 38 μm. The fibres were inserted into an HDPE film to form a cylindrical fibre bundle having a diameter of 41.4 mm. The demoulding force was determined according to the method described above. The demoulding force was measured on each of 30 fibre bundles with the inventive double curl having a first wavelength of 7 mm and an amplitude of 0.4 mm and a second wavelength of 30 mm with an amplitude of 3.5 mm.

For comparison, the demoulding force was measured on 30 fibre bundles which differed from the fibre bundles according to the invention only in the nature of the curl. The fibres had a single curl having a wavelength of 30 mm and an amplitude of 3.5 mm.

From 30 measurements, an averaged demoulding force of 4.2 N was found for the fibre bundles according to the invention. An averaged demoulding force of 3.4 N for fibre bundles was found for the fibre bundles with the singly curled fibres.

The invention claimed is:

1. Hollow-fibre membrane having at least one first curl in the form of a first wave which is characterized by a first oscillation plane and a first wavelength and at least one second curl in the form of a second wave which is characterized by a second oscillation plane and a second wavelength, wherein the first oscillation plane and the second oscillation plane confine an angle with one another which is from 70° to 110°, said at least one first curl and said at least one second curl comprise periodic waveforms, and said at least one second curl is applied to said at least one first curl.

2. The hollow-fibre membrane according to claim 1, wherein the angle is from 85° to 95°.

3. The hollow-fibre membrane according to claim 1, wherein the angle is 90°.

4. The hollow-fibre membrane according to claim 1, wherein the first wavelength and the second wavelength are different from one another.

5. The hollow-fibre membrane according to claim 1, wherein the wavelength of the first wave is from 3 to 15 mm.

6. The hollow-fibre membrane according to claim 1, wherein the wavelength of the second wave is from 20 to 50 mm.

7. The hollow-fibre membrane according to claim 1, wherein the first wave has a first amplitude within the range from 0.2 to 0.6 mm.

8. The hollow-fibre membrane according to claim 1, wherein the second wave has a second amplitude within the range from 2.0 to 6.0 mm.

9. The hollow-fibre membrane according to claim 1, wherein the first wave and the second wave are sine-shaped.

10. The hollow-fibre membrane according to claim 1, wherein said hollow-fibre membrane has a demoulding force of from 3.4 to 10.0 N based on a hollow-fibre membrane bundle produced therefrom having 16,896 fibres, when the hollow-fibre membrane bundle is demoulded from a cylindrical shell having a diameter of 41.4 mm.

11. The hollow-fibre membrane according to claim 10, wherein the demoulding force is from 3.4 to 7.0 N.

12. A process for producing the hollow-fibre membrane of claim 1, said process comprising at least steps (a) and (b):
(a) providing a hollow fibre having a first curl in the form of a first wave which is characterized by a first oscillation plane and a first wavelength;

(b) applying a second curl to the hollow-fibre membrane provided in step (a), in the form of a second wave which is characterized by a second oscillation plane and a second wavelength; wherein the application in step (b) being effected such that, after application, the first oscillation plane and the second oscillation plane confine an angle with one another which is from 70° to 110°.

13. The process according to claim 12, wherein the first wavelength and the second wavelength are selected such that the first wavelength is shorter than the second wavelength.

14. The process according to claim 12, wherein the hollow-fibre membrane of step (a) is passed through at least two counter-rotating cog wheels in step (b), the rotation axes of the cog wheels not being aligned perpendicular to the first oscillation plane.

15. A bundle comprising a plurality of the hollow-fibre membrane as defined in claim 1.

16. A filter device for hemodialysis, comprising a housing and the bundle as defined in claim 15 and arranged in said housing.

17. A method to filter a fluid comprising passing the fluid through said filter device of claim 16 to obtain a filtered fluid.

18. The hollow-fibre membrane according to claim 1, wherein said at least one first curl and said at least one second curl consists of periodic waveforms.

* * * * *